Oct. 13, 1959 E. S. PURINGTON ET AL 2,908,754

TELEVISION RECEIVING AND RECORDING SYSTEMS

Filed June 13, 1955 12 Sheets-Sheet 1

INVENTORS
ELLISON S. PURINGTON
JOHN HAYS HAMMOND JR.

BY

ATTORNEY

TELEVISION RECEIVING AND RECORDING SYSTEMS

Filed June 13, 1955 12 Sheets-Sheet 2

INVENTORS
ELLISON S. PURINGTON
JOHN HAYS HAMMOND JR.
BY
ATTORNEY

Oct. 13, 1959 E. S. PURINGTON ET AL 2,908,754

TELEVISION RECEIVING AND RECORDING SYSTEMS

Filed June 13, 1955 12 Sheets-Sheet 3

INVENTORS
ELLISON S. PURINGTON
JOHN HAYS HAMMOND JR.
BY
ATTORNEY

INVENTORS
ELLISON S. PURINGTON
JOHN HAYS HAMMOND JR.
BY
ATTORNEY

INVENTORS
ELLISON S. PURINGTON
JOHN HAYS HAMMOND JR.
BY
ATTORNEY

INVENTORS
ELLISON S. PURINGTON
JOHN HAYS HAMMOND JR.
BY
ATTORNEY

INVENTORS
ELLISON S. PURINGTON
JOHN HAYS HAMMOND JR.
BY [signature]
ATTORNEY

INVENTORS
ELLISON S. PURINGTON
JOHN HAYS HAMMOND JR.

BY [signature]

ATTORNEY

Oct. 13, 1959 E. S. PURINGTON ET AL 2,908,754

TELEVISION RECEIVING AND RECORDING SYSTEMS

Filed June 13, 1955 12 Sheets-Sheet 9

INVENTORS
ELLISON S. PURINGTON
JOHN HAYS HAMMOND JR
BY
ATTORNEY

Oct. 13, 1959 E. S. PURINGTON ET AL 2,908,754

TELEVISION RECEIVING AND RECORDING SYSTEMS

Filed June 13, 1955 12 Sheets-Sheet 10

INVENTORS
ELLISON S. PURINGTON
JOHN HAYS HAMMOND JR.
BY
ATTORNEY

INVENTORS
ELLISON S. PURINGTON
JOHN HAYS HAMMOND JR.
BY [signature]
ATTORNEY

Oct. 13, 1959 E. S. PURINGTON ET AL 2,908,754

TELEVISION RECEIVING AND RECORDING SYSTEMS

Filed June 13, 1955 12 Sheets-Sheet 12

INVENTORS
ELLISON S. PURINGTON
JOHN HAYS HAMMOND JR.

BY

ATTORNEY

United States Patent Office 2,908,754

Patented Oct. 13, 1959

2,908,754

TELEVISION RECEIVING AND RECORDING SYSTEMS

Ellison S. Purington and John Hays Hammond, Jr., Gloucester, Mass.

Application June 13, 1955, Serial No. 514,943

2 Claims. (Cl. 178—7.4)

This invention relates to receivers for television pictures and particularly to a receiving system having means to record and project any selected view.

It is often desired to examine an occasional view appearing on a television screen for a longer time than is provided by the fleeting view of a series of moving pictures, or to record a view for future reference or for comparison with subsequent views. This may be desirable whether the system is an open system, transmitted by radio, or a closed system in which the video signals are transmitted by cable.

An object of the present invention is to provide a system including a standard receiver and a separate monitor connected to the standard receiver in such a way that any picture seen on the picture tube of the standard receiver can be made to appear on the picture tube of the monitor to be automatically photographed, developed, and advanced to a position where it is projected on a viewing screen for examination. This entire process requires only a few seconds, thus making it possible to view at leisure a selected view a short time after its original appearance on the screen of the receiver. Furthermore, a permanent record is provided of the selected view for future reference or filing.

Another object of the invention is to produce a negative picture on the screen of the monitor picture tube so that the finished record on the film and the projected image on the viewing screen will be a positive reproduction of the original picture.

In accordance with the invention a standard television receiver is tapped at a point which provides the composite video and synchronizing signals. This composite signal is processed by electronic circuits to provide a separate video signal and a synchronizing signal. The video signal is reversed in sense so that when impressed on the monitor picture tube the light pattern on its screen is a negative of the light pattern as it appears on the standard picture tube. The synchronizing signal is used to generate new horizontal and vertical sweep waves and new blanking waves so poled as to blank the monitor beam on the black side.

A timing device is provided which is actuated by a push button at the standard receiver. This timing system unblanks the monitor electron beam at the start of the next frame after the push button is actuated, and reblanks the beam after one or a predetermined number of frames are completed on the monitor screen. The timing system also opens and closes the camera shutter so as to overlap but not to limit the photographic exposure, and controls the various processes of development and projection subsequent to the photographic exposure.

A delay device is provided which may be used to delay the composite signal before processing to compensate for the time delay between seeing a view and actuating the push button. By this means the actual view seen on the standard screen may be recorded and later viewed.

In a copending application Serial No. 279,734, filed April 1, 1952, now Patent No. 2,842,614, issued July 8, 1958 and entitled Remotely Controlled Receiver for Recording Selected Portions of Telecast, a method was disclosed of recording a still picture which is transmitted from a sending station, and is processed by a high-speed method described by Clifton Tuttle. This method includes means for timing the automatic processes of development, washing, fixing, and second washing of the exposed photographic film, and then advancing the film to a second position where it is projected onto a viewing screen.

This method substantially as described in the said application is used in the present invention to process and project the exposed film.

The invention also consists of certain new and original features of construction and combination of parts hereinafter set forth and claimed.

The nature of the invention as to its objects and advantages, the mode of its operation and the manner of its organization, may be better understood by referring to the following description, taken in connection with the accompanying drawing forming a part thereof, in which Figure 1 is a block diagram showing the essential cooperating parts of a system embodying the invention;

Like reference characters denote like parts in the several figures of the drawing.

In the following description parts will be identified by specific names for convenience, but they are intended to be generic in their application to similar parts.

Figure 1:
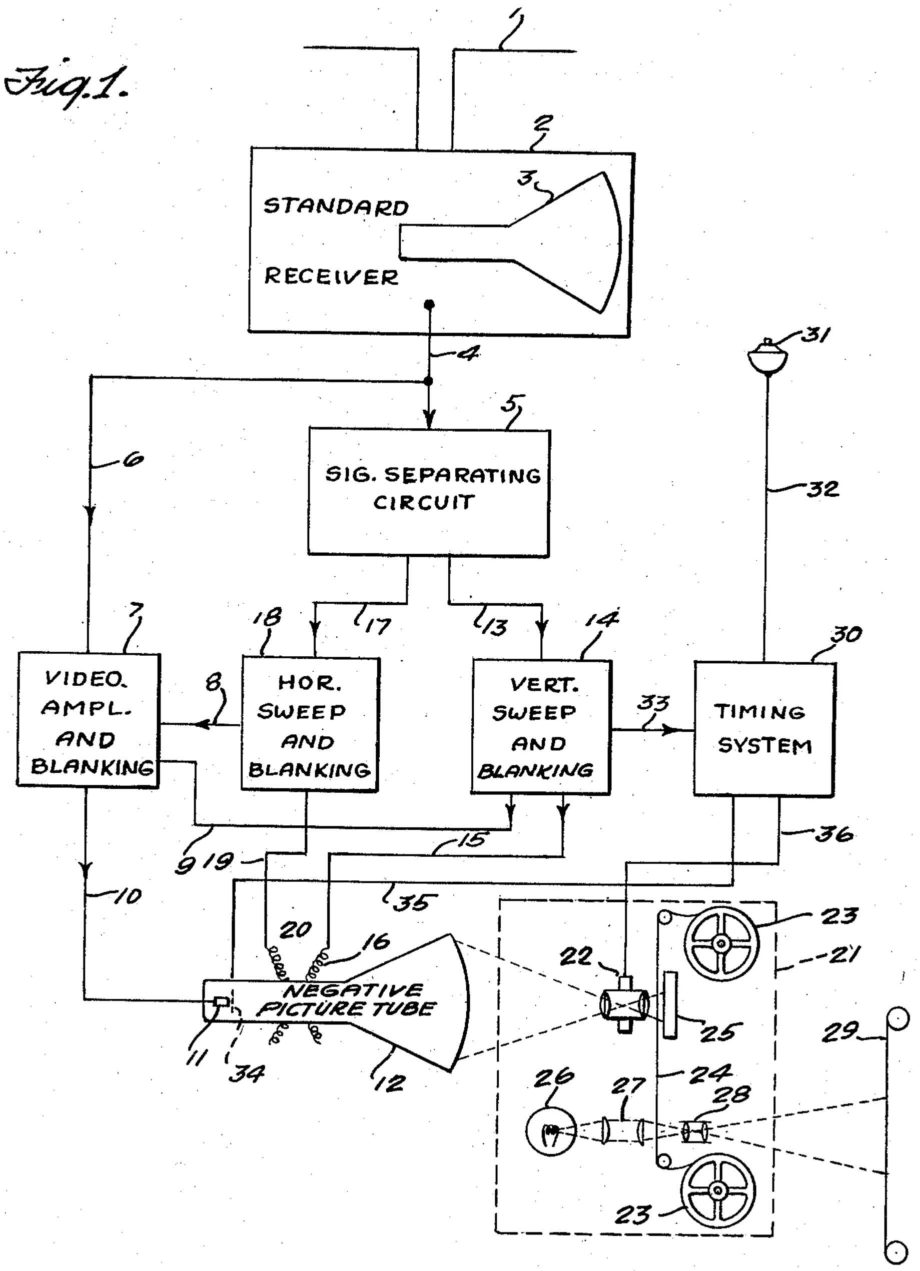

In Figure 1, block 2 is a standard television receiver fed by antenna 1. The standard picture tube of the receiver is indicated at 3. Line 4 taps, by plug or otherwise, into the video amplifier of the standard receiver 2, and conveys the composite video and synchronizing signals to the signal separating circuits contained in block 5 and the video amplifier in block 7. If a closed system is used the video amplifier and audio circuits in block 2 are fed directly from the camera and microphone by a cable not shown in Figure 1, and the antenna and radio circuits in block 2 are not used.

The composite wave, including the video signal, is fed by line 6 to block 7 where the signal is further amplified, reversed in sense, and reblanked in the black region by pulses developed in the horizontal and vertical sweep circuits, and fed to block 7 through lines 8 and 9, respectively.

The blanked video signal is fed through line 10 to the cathode 11 of the monitor picture tube 12.

The synchronizing pulses are stripped from the video signal in block 5 producing pulses of horizontal sweep frequency and also pulses of vertical sweep frequency.

The sync pulses of vertical sweep frequency are fed by line 13 to block 14 which contains circuits for producing the vertical deflection pulses and the vertical blanking pulses. The vertical deflection pulses are fed through line 15 to the magnetic or electric deflecting means 16 for picture tube 12. The vertical blanking pulses are fed through line 9 to block 7 previously described.

The sync pulses of horizontal sweep frequency from block 5 are conducted through line 17 to block 18, which contains circuits for producing the horizontal deflecting wave and the horizontal blanking pulses. The former is conducted by line 19 to the magnetic or electric deflecting means 20 for the monitor picture tube 12. The blanking pulses are conveyed to block 7 by line 8 as already described.

The monitor picture tube 12 is mounted in operative relation to the photographic, processing, and projecting equipment, described in the said copending application, enclosed in block 21. Included in block 21 are the lens and camera shutter 22, the film reels 23, the film 24, the processing head 25, the projection lamp 26, the condensing lenses 27, and the projection lenses 28. The viewing screen 29 upon which the final image is projected is shown external to block 21.

The timing system in block 30 contains circuits for timing and coordinating the exposure and processing of the film. A push button 31 when actuated, operates through line 32 to set the circuits in block 30 ready for starting the cycle at the beginning of the first vertical sweep wave following the closing of the push button contact. The vertical control pulses are fed to block 30 from block 14 over line 33. Following the beginning of the cycle by a predetermined time lag the blanking voltage, conveyed to the grid 34 of picture tube 12 by line 35, is removed thus unblanking the electron beam of tube 12 and beginning the exposure of the film. By means of a counter circuit in block 30, the blanking voltage is reapplied and the exposure of the film ends after a predetermined number of complete frames, each frame consisting of two fields. Generally, if motion in the pictures is rapid, the beam would be unblanked for only one complete frame.

The circuits of block 30, acting through line 36, open shutter 22 before the electron beam is unblanked and close the shutter after the electron beam is reblanked. Thus the shutter, which is relatively slow in action, does not determine the exposure time but merely serves as a safety means of protecting the film from stray light between exposures.

The cycling process involving the development, processing, and projection of the film in block 21 is initiated by the same pulse which operates the shutter 22. These processes are fully described in the said copending application.

Figure 2:
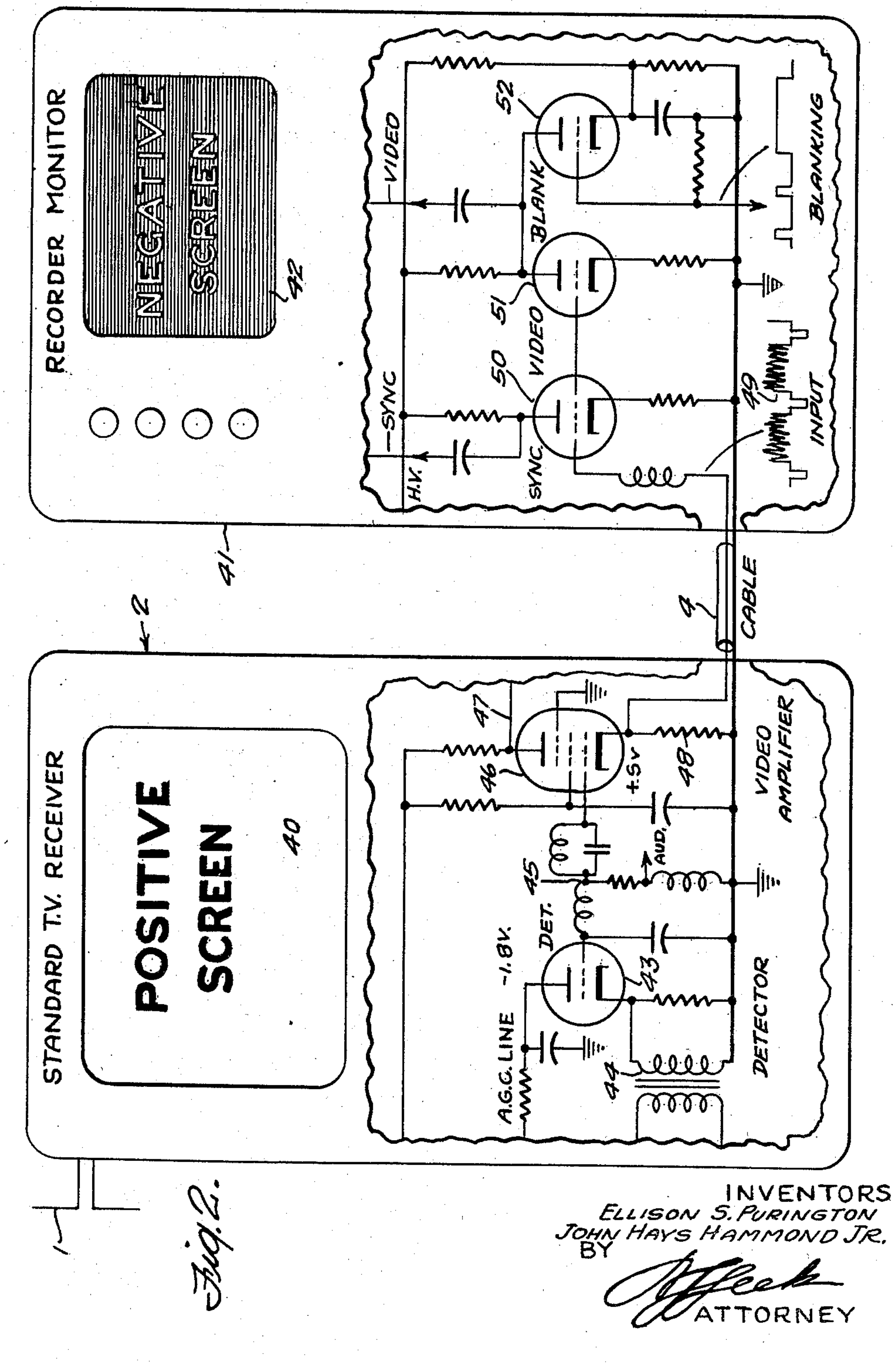
Figure 2 shows in block form a standard receiver and a monitor with portions of the circuits of each.

Figure 2 shows the standard television receiver 2 which produces a positive picture from standard signals received from antenna 1 or from video signals received over a cable not shown. The screen 40, marked Positive Screen, is the screen of the picture tube 3 in Figure 1.

Block 41 is the complete monitor comprising the monitor picture tube 12 and the circuits in blocks 5, 7, 14, 18, and 30 in Figure 1. The picture tube 12 has a screen 42, indicated as a Negative Screen in Figure 2. The connecting cable 4 of Figure 1 is shown in Figure 2.

Within the receiver 2 is a detector 43, which produces a composite video signal from the output of the last intermediate frequency transformer 44. The composite signal carrying the complete blanked video, sync, and audio information, is separated at point 45, the blanked video and sync portion being impressed on the grid circuit of the video amplifier 46. The anode output, through line 47, drives the cathode of the picture tube 3 in receiver 2, and also provides the sync signals for producing the horizontal and vertical sweeps for this tube. The connections are such that a positive picture results on screen 40 from the standard type of signal delivered by the transformer 44.

The plate current in amplifier 46 develops across its cathode resistor 48, which is not bypassed, a signal voltage similar in sense to the signal impressed on the grid of tube 46 and similar to the signal impressed on line 47. This signal, shown in trace 49, is impressed through cable 4 on the grids of the sync tube 50 and the video tube 51. These tubes are preferably high conductance triodes with cathode resistors not bypassed, especially in view of the low effective input impedance of these tubes.

The anode of tube 51 is directly connected to the anode of the blanking tube 52, which, as will be explained later, is a twin triode with plates in parallel but the grids of which are separately excited, one by the horizontal blanking pulses and the other by the vertical blanking pulses.

The output of tube 50 is used solely for producing the horizontal and vertical sweeps, and for video reblanking. The output of tube 51 is the video signal reblanked by reason of pulses applied to the grids of tubes 52, and is used to drive a second video amplifier as will be explained. Tube 50 and its associated circuits are contained in block 5 of Figure 1 while tubes 51 and 52 are contained in block 7 of Figure 1.

Figure 3:
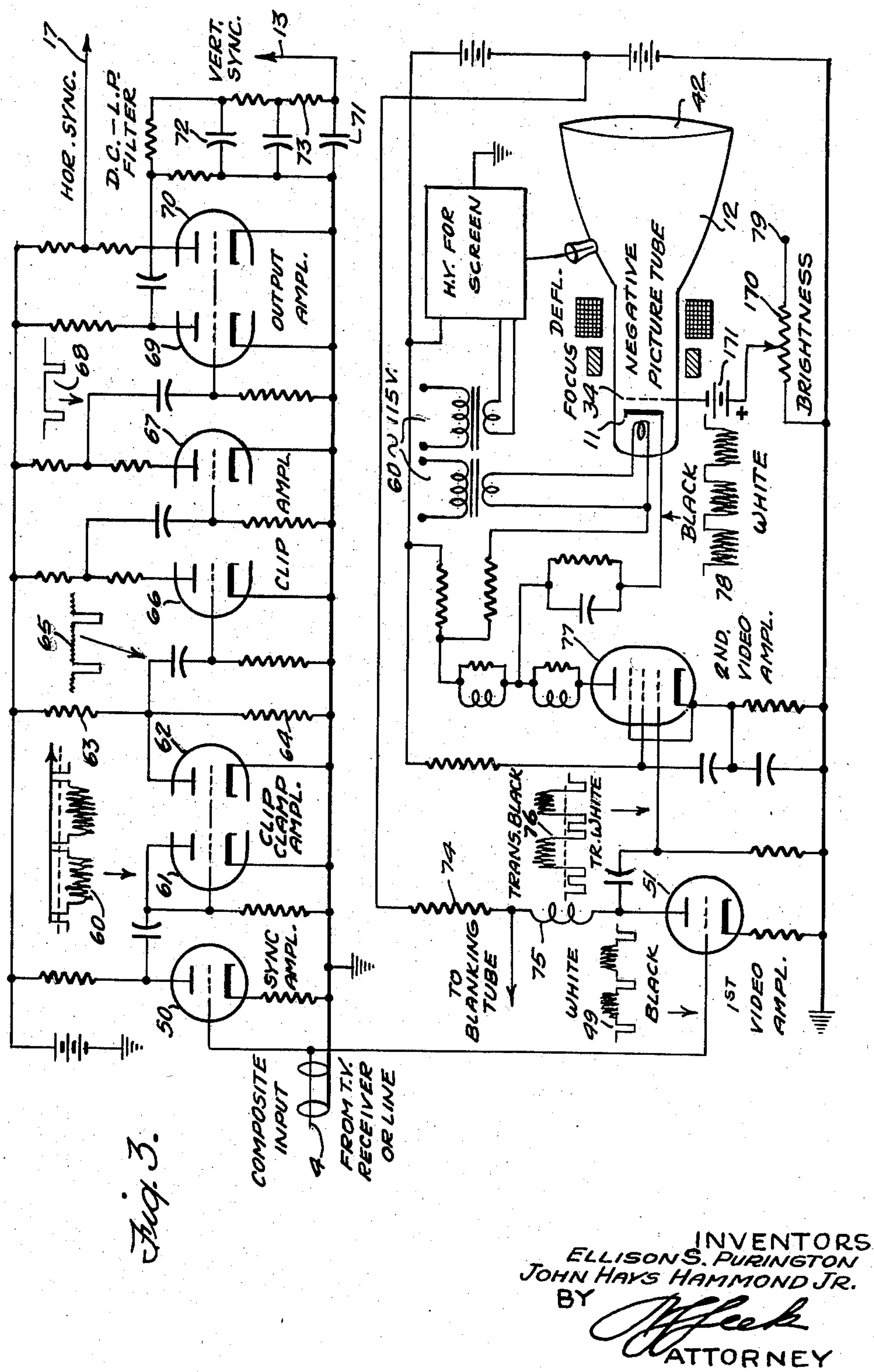
Figure 3 shows schematically the sync separation and the video circuits of the monitor.

The sync separating circuits of block 5 of Fig. 1 are shown in the upper portion of Figure 3. The output of sync tube 50, shown in trace 60, is impressed on a clip-clamp amplifier circuit connected to the twin tube 61 and 62. The wave shown at 60 is first clipped at the dotted line by tube 61 leaving the upper ends of the sync pulses substantially at ground level as indicated by the arrow in trace 60. The amplifier tube 62 is operated at reduced plate voltage, obtained by bridging resistors 63 and 64, and has a suitable external output impedance. Since the output of tube 62 is small and may contain a trace of the video signal as shown by trace 65, it is amplified by the two-stage clip-amplifier comprising the two halves 66 and 67 of a twin triode. The output wave of this amplifier is shown in trace 68 and is impressed upon the connected girds of the output amplifier comprising tubes 69 and 70. The output of tube 70, supplied over line 17, consists of positive pulses used to generate the horizontal sweep and blanking waves. The plate circuit of tube 69 contains the low-pass filter 72, and hence the output voltage over line 13 contains only the vertical pulses which are contained in the input of tube 50, and shaped by the intermediate circuits in the same manner as for the shorter horizontal pulses. These positive vertical pulses over line 13 are used to generate vertical sweep pulses and vertical blanking pulses.

The video amplifier tube 51 has its anode fed through resistor 74 and peaking inductor 75. The junction between elements 74 and 75 is connected directly or through a resistor to the connected anodes of the twin blanking tube 52, not shown in Figure 3. The output wave form of tube 51 would be the inverse of the input wave form shown in trace 49, except for the fact that the current drawn by the blanking tube 52, when its grids are driven positive by the blanking pulses, causes a voltage drop through resistor 74 which then causes the sync pulse and its blanking pedestal to be depressed. The resulting output wave form, showing the effect of the horizontal blanking pulses, is shown in trace 76. The region of the output signal 76 marked Transmitted Black is that part of the signal which produces black on the standard positive screen 40 in block 2, and similarly the region marked Transmitted White would appear as white on positive screen 40.

The signal 76 is impressed upon the control grid of the second video amplifier tube 77 which inverts the signal and clips off the lower portion of the input signal 76, at the dotted line in trace 76, giving an output signal shown by trace 78. This output signal drives the cathode 11 of the monitor negative-picture tube 12. The portion of the signal 78 marked Black appears as black on the screen 42 of tube 12, and hence the blanking occurs on the black side of the signal.

It will be understood that the circuitry is mostly conventional and is therefore not described in detail. Many refinements are possible. Thus, if the average light value of the transmitted material varies from time to time, a diode-type D.C. restorer may be used to change the average brightness of the screen correspondingly, by conventional cathode or grid D.C. insertion methods.

It should be emphasized that while it is permissible to reblank during the entire periods of original blanking, it is preferable that the blanking be confined to the retrace period in order to preserve a clean boundary of the frame. Failure to blank at the best time can, however, be corrected by masking the picture.

Figure 4:
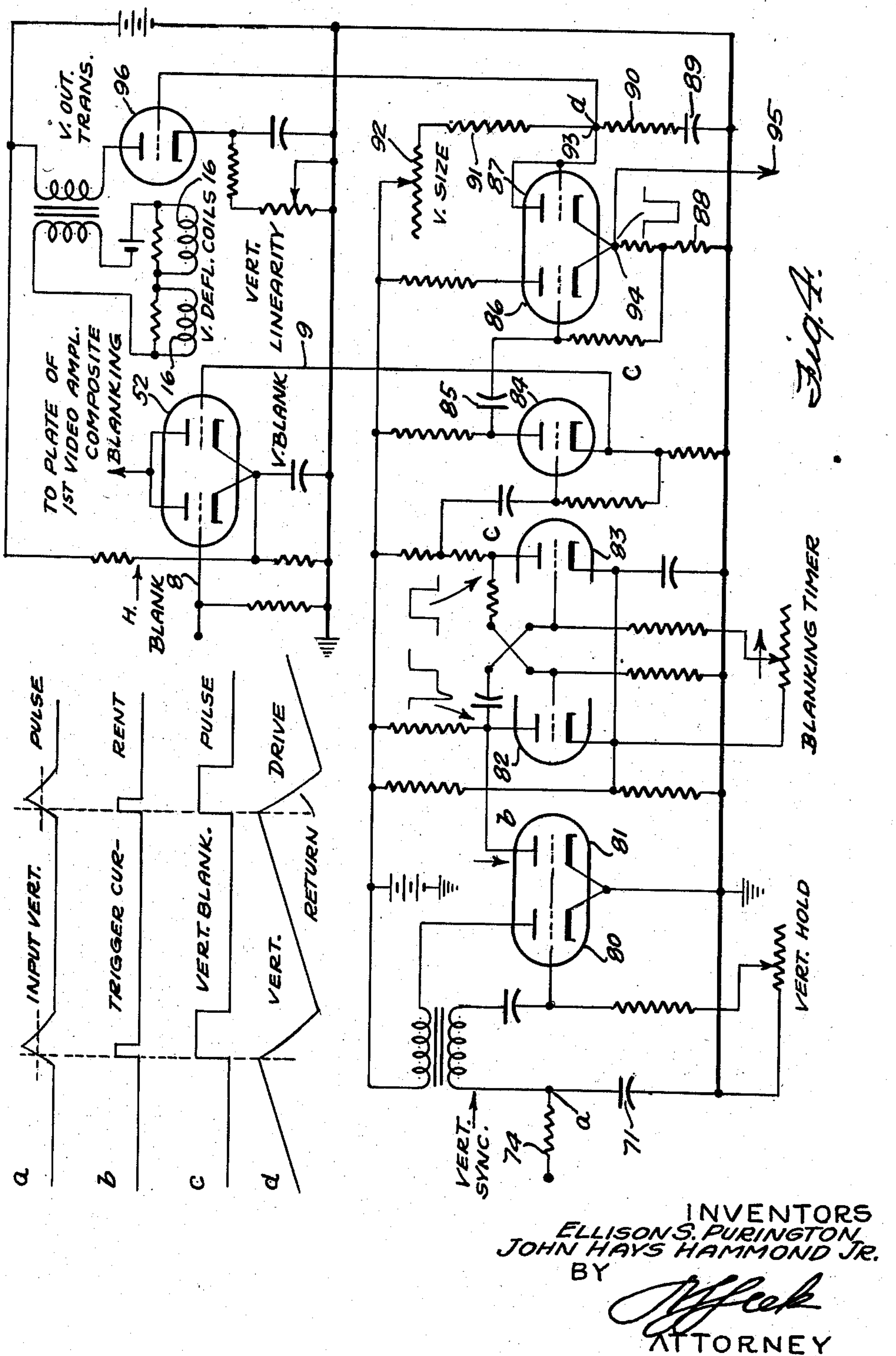
Figure 4 shows schematically the vertical-deflection circuits with provisions for vertical blanking.

Figure 4 shows simple forms of vertical sweep and vertical blanking pulse generators in which the blanking occurs only during the retrace period. The tubes and associated circuits of Figure 4, except for tube 52, are contained in block 14 of Figure 1.

The vertical pulse signal from line 13 of Figure 3, and shown in trace *a*, Figure 4, is taken from the junction of capacitor 71 and resistor 73, which are components of the last section of the low-pass filter 72. These vertical pulses start the blocking oscillator 80 in a well known manner. The voltage wave produced by the blocking oscillator 80, acting through tube 81, controls a single-shot multivibrator comprising tubes 82 and 83. The triggering pulses occurring in the plate circuit of tube 81 are shown in trace *b* of Figure 4, and the stretched output wave of multivibrator tube 83 is shown in trace *c* of Figure 4. This latter pulse train is impressed on the grid of triode 84. The voltage drop created in the cathode resistor of tube 84 is impressed through line 9 upon one of the grids of the blanking tube 52.

The pulse developed at the plate of tube 84, acting through coupling capacitor 85, is used to start and terminate the sweep generator comprising tubes 86 and 87. The negative going pulse impressed upon the grid of tube 86 causes tube 86 to pass current except during the pulse. The consequent voltage drop across the joint cathode resistor 88 causes tube 87 to conduct only during the pulse, and to discharge capacitor 89 through resistor 90 during the pulse. Between pulses capacitor 89 charges nearly linearly through resistors 91, rheostat 92 and peaking resistor 90. The wave developed at point 93 is shown in trace *d* of Figure 4. This linear sweep and retrace voltage is impressed upon the grid of the vertical-deflection output tube 96.

Figure 5:
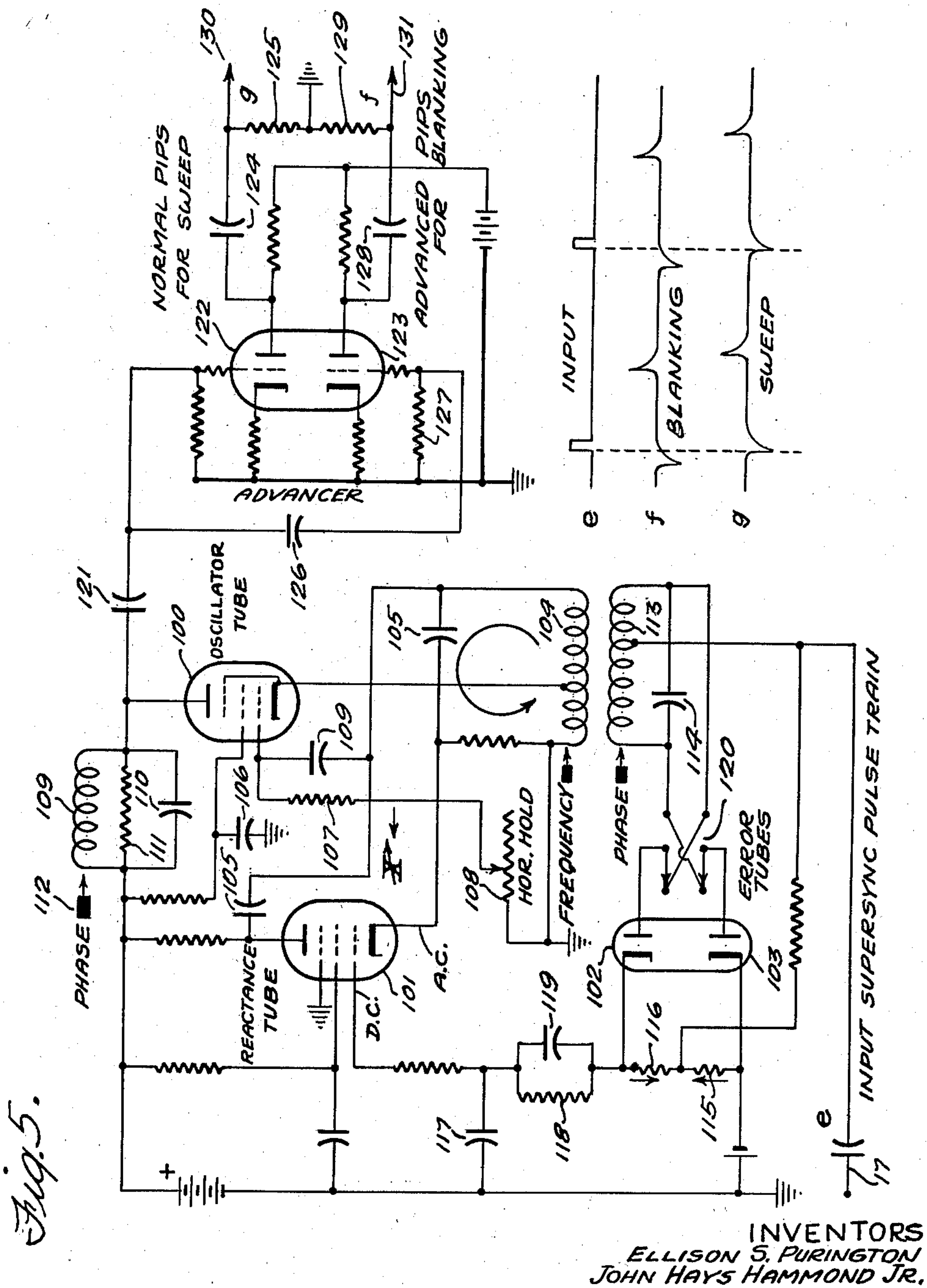
Figure 5 shows schematically the circuits for producing the pulse pips for use in forming the horizontal blanking pulses and the horizontal sweep.

For the horizontal sweep and blanking system the circuits are somewhat more complex. The first part of these circuits is shown in Figure 5 and the last part in Figure 6. These circuits are all contained in block 18 of Figure 1.

The pulse train delivered over line 17 of Figure 3, and shown in trace *e* of Figure 5, is impressed upon a "synchrolock" system to control the frequency and phasing of an oscillator tube 100, in accordance with the running average of the difference between the oscillator and the pulse-train phasing. The synchrolock comprises a reactance tube 101 and the discriminator or error tubes 102 and 103.

The oscillator, using pentode 100, is a Hartley-type oscillator with a main oscillation circuit comprising inductor 104 and capacitor 105. The screen grid is grounded for alternating voltages by capacitor 106 and acts as the plate of the three electrodes comprising the oscillator proper. The grid bias is supplied by the voltage drop across grid resistor 107 and the variable resistor 108. These resistors are bypassed by capacitor 109 which also serves to excite the control grid from the oscillating circuit. The plate circuit of the conventional reactance tube 101 is connected across capacitor 105 and varies the frequency of generated oscillations in response to changes in the D.C. voltage of the first grid of tube 101. The plate circuit of oscillator tube 100 contains a tuned circuit comprising inductor 109 and capacitor 110 shunted by resistor 111 to adjust the Q of the circuit. A variation of the inductance of coil 109 by the iron plug 112 shifts the phase of the plate current pulses of tube 100 and hence varies the phase of the oscillation in inductor 104.

The oscillations in inductor 104 induce a sinusoidal voltage across the tuned circuit comprising inductor 113 and capacitor 114. This voltage acts oppositely on the plates of the rectifier tubes 102 and 103, causing equal and opposite pulses through resistors 115 and 116. These pulses are averaged by the low-pass filter comprising capacitors 117 and 119 and resistor 118 and hence produces no D.C. voltage at the grid of tube 101. If the added pulses from line 17 occur when the sinusoidal voltage across capacitor 114 passes through zero, no change will occur in the D.C. voltage of the grid of tube 101. When, however, the pulses from line 17 occur at any other time than at the zero cross over of the sinusoidal voltage, the pulses in resistors 116 and 115 are unequal and a resulting correction voltage develops on the grid of tube 101 which varies its effective plate-to-cathode reactance and hence the phase of the sinusoidal voltage of the oscillatory circuit of oscillator 100. A reversing switch 120 permits the center of the pulses to be timed to occur at the center of either the upswing or the down-swing of the sinusoidal voltage across capacitor 114.

The nearly sinusoidal plate voltage of oscillator tube 100 is impressed through a low impedance coupling capacitor 121 upon a square-wave-producing system using the two triodes 122 and 123 of a duo-triode. The output of triode 122 is passed through a differentiating circuit comprising capacitor 124 and resistor 125. The output pips across resistor 125 are shown in trace *g* of Figure 5 and are used to time the horizontal sweep.

The input sinusoidal voltage from the plate of oscillator 100 is passed through a phase-advancing network comprising capacitor 126 and resistor 127 and is impressed upon the rigid of square-wave generating tube 123. The output of tube 123 is differentiated by capacitor 128 and resistor 129 yielding the advanced pips shown in trace *f* of Figure 5. This pulse train is used to time the horizontal blanking.

As is seen in Figure 5, the negative pips of trace *g* are timed to coincide with the leading edge of the input pulses in trace *e*, while the negative pips of trace *f* occur slightly prior to the input pulses *e* for establishing the "front porch."

Figure 6:
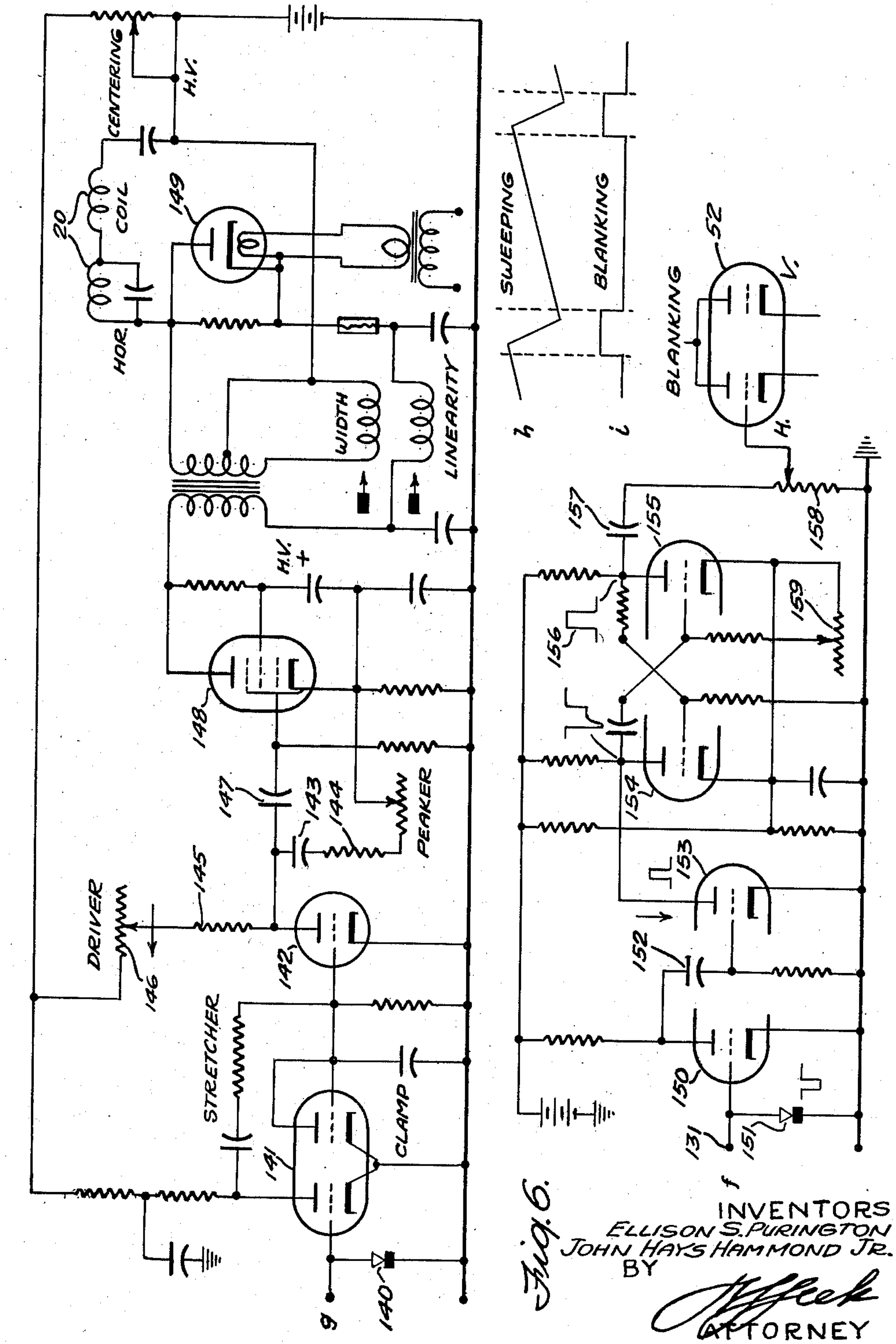
Figure 6 shows schematically the final horizontal sweep and blanking circuits.

Continuing now with Figure 6, the sweep pips shown in trace *g* of Figure 5 are impressed through line 130 across a crystal diode 140 to remove the positive pips, and then upon the grid of the amplifier and stretching tube 141. The output of tube 141 is impressed upon the discharge tube 142 which discharges capacitor 143 through resistor 144 during the retrace period. The nearly linear charging of capacitor 143 through resistor 145 and rheostat 146 and also resistor 144 produces the scanning portion of the sweep. The voltage across capacitor 143 and resistor 144, which is approximately of the shape shown in trace *h* of Figure 6, is impressed through coupling capacitor 147 upon the grid of the output tube 148, which in turn drives a conventional "bootstrap" circuit with damper 149, to operate the horizontal sweep coils 20.

Substantially all of the circuit in the upper part of Figure 6 is conventional except for the stretcher circuit which increases the duration of the pulses and thus provides for an increase of the time of discharge of the capacitor 143 over that which would be provided by the initial pips.

The pips for blanking, shown in trace *f* in Figure 5, are impressed through line 131 upon the grid of the amplifier tube 150. The positive pips of trace *f* are removed by the crystal diode 151. The positive voltage pulses on the plate of tube 150 are impresesd through coupling capacitor 152 upon the grid of tube 153. The positive pulses of current through tube 153 trigger the single-shot multivibrator using tubes 154 and 155. The operation of this portion of the circuit is well known and similar to the operation of the circuits associated with tubes 82 and 83 in Figure 4. The stretched positive square pulse, shown in trace *i* of Figure 6, which occurs on the plate of tube 155, is applied through a blocking capacitor 157 and potentiometer 158 to the horizontal-blanking grid of blanking tube 52. In this manner, a blanking pulse is created which starts before the retrace and ends after the retrace. The duration of the "front porch" is determined by the time constant of the phase-advancing circuit feeding the grid of tube 123 in Figure 5, and the duration of the blanking pulse is determined by the setting of the timer 159 of the multivibrator.

The circuits described in Figures 2, 3, 4, 5, and 6 would function to produce a continuing negative image on the screen of the monitor as long as the video and synchronizing signals are fed from the standard receiver to the monitor over cable 4. In order to photograph selected pictures the negative image is blanked off except for the duration of those frames which are to be photographed. The timing system within block 30 of Figure 1 accomplishes this timed unblanking of the negative picture tube by impressing a positive pulse on grid 34 of picture tube 12 as already described. The circuits for one form of timing system are shown in Figure 8. The operation of these circuits is best described by reference to the wave forms shown in the time diagram of Figure 7.

Figure 7:
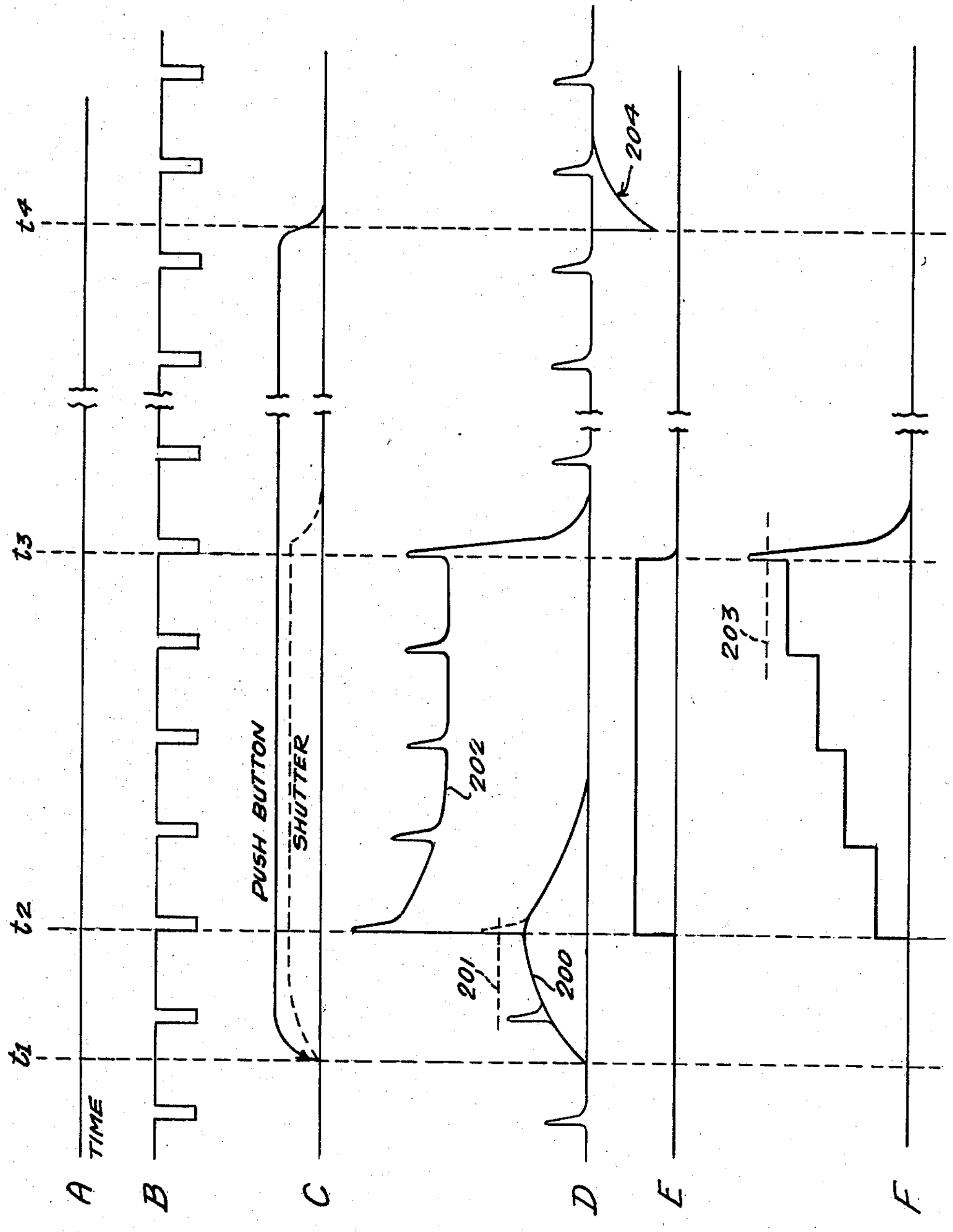
Figure 7 is a time diagram of events in the operation of the timing system.
Figure 8:
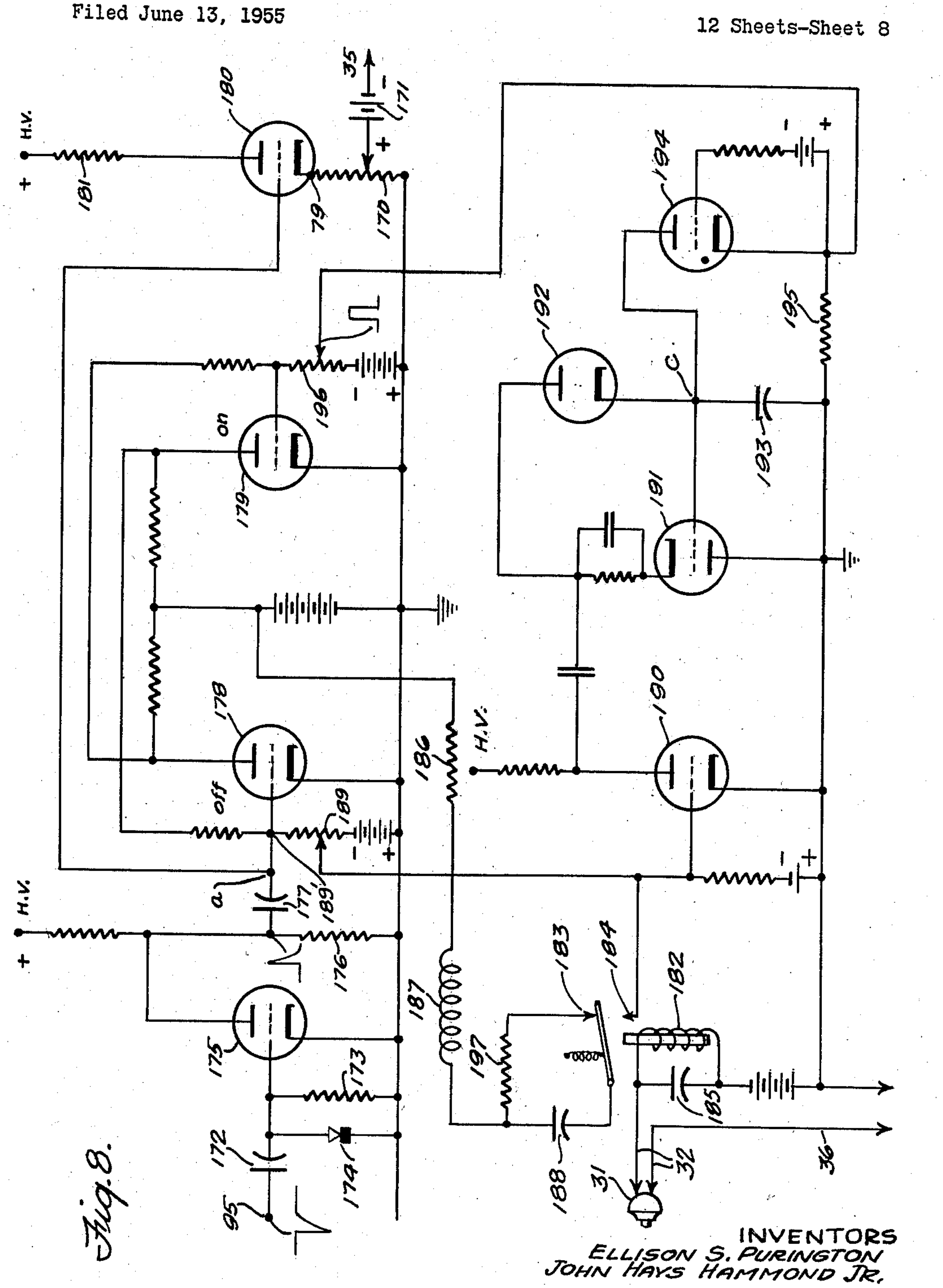
Figure 8 is a schematic circuit diagram of one modification of the timing system.

The cycle of events during the photographing period is referred to the time scale A in Figure 7. Previous to time $t_1$ when push button 31 is actuated, the grid 34 of picture tube 12 is made sufficiently negative with respect to the cathode 11 by adjustment of battery 171 so that the electron beam is completely blanked off, it being assumed there is no current through resistor 170 in Figure 3. The push button 31 is assumed to remain closed during the time from $t_1$ to $t_4$ but the length of this time, as will be explained, has no effect upon the events initiated at $t_1$, except that the circuits are not reset for a new cycle until $t_4$.

The camera shutter 22 starts to open at $t_1$ but will not be fully open until a later time $t_2$ because of inertia of the mechanism. Hence a time lag must be introduced before the blanking voltage, line E, is increased, but this time must be controlled by the vertical sweep pulses (line B Figure 7) so that it occurs during the fly back time of the vertical sweep as at $t_2$ and persists for a predetermined number of complete frames. The blanking voltage in line E of Figure 7 must be reapplied at $t_3$ during the fly-back time following an even number of fields, as for example, four, as shown in Figure 7. The time $t_3$ is determined by a counter which is set to trigger off after $2n$. fields, where $n$ is a whole number. The counter wave is shown in line F of Figure 7.

Figure 8 shows a system of circuits in block 30 which will perform the functions described above. The negative going vertical blanking pulses from point 94 in Figure 4 are fed through line 95 to the differentiating circuit 172—173. The positive pips are removed by crystal diode 174 while the negative pips are fed to the input of amplifier 175 and appear as positive pips across plate resistor 176. This voltage is fed through coupling capacitor 177 to the input of an Eccles-Jordan trigger circuit comprising triodes 178 and 179 with the necessary plate-circuits and grid-circuit resistors. Before time $t_1$ tube 178 is non-conducting and tube 179 is conducting.

Tube 178 is made to conduct when the voltage of its grid at point *a* is pulsed sufficiently positive, but the pulses caused by the input to tube 175 are alone insufficient to cause tube 178 to change to the conducting state.

The grid voltage of tube 178 is conductively coupled to the grid of switching tube 180, the plate of which is supplied from the high voltage source through resistor 181. When tube 178 is non-conducting, tube 180 is also non-conducting, giving no voltage across cathode resistor 170. The grid of the picture tube 12 is connected through line 35 to the usual brightness control adjustment on resistor 170.

Push button 31, when actuated, closes relay 182 having a front contact 183 and a back contact 184. The current through relay 182 also opens the camera shutter 22 through line 36. A capacitor 185, connected across the relay coil, serves to delay the closing of the relay while hastening the opening of the shutter. When the relay closes contact 184 a slowly rising pulse, shown at 200 in line D of Figure 7, passes through resistor 186, inductor 187, capacitor 188, and an adjustable portion of grid resistor 189. The superposition of the positive pulses from resistor 176 on the positive voltage at (*a*) Figure 7 produced by pulse 200 exceeds a triggering value 201 and causes tube 178 to conduct at a fly back time of the vertical sweep such as at $t_2$.

The sudden rise in voltage of point *a*, caused by the conduction of tube 178, and shown as pulse 202, starts a counter comprising tubes 190, 191, and 192. This counter circuit is well known and is described on page 419 of the book "Elements of Television Systems" by Anner. The counting is timed by pulses across resistor 176 as long as the grid of tube 190 is held at a positive potential by the conduction of tube 178. The voltage of point C, across capacitor 193 is of the form shown in line F of Figure 7. When this voltage rises above a predetermined threshold value 203, the thyratron 194 conducts and capacitor 193 discharges through resistor 195 causing a positive pulse to occur across grid resistor 196 of tube 179. This pulse causes tube 179 to conduct. The voltage of point 189$^1$ decreases as tube 179 conducts causing tube 180 to stop conducting and thus reduces the voltage across resistor 170, and the exposure of the film in block 21 ends at $t_3$.

When the push button 31 is released, as at some time $t_4$, contact 183 is closed and capacitor 188 discharges through resistor 197 as shown at 204 in Figure 7. This event completes the resetting of all circuits ready for a new complete cycle.

Figure 9:
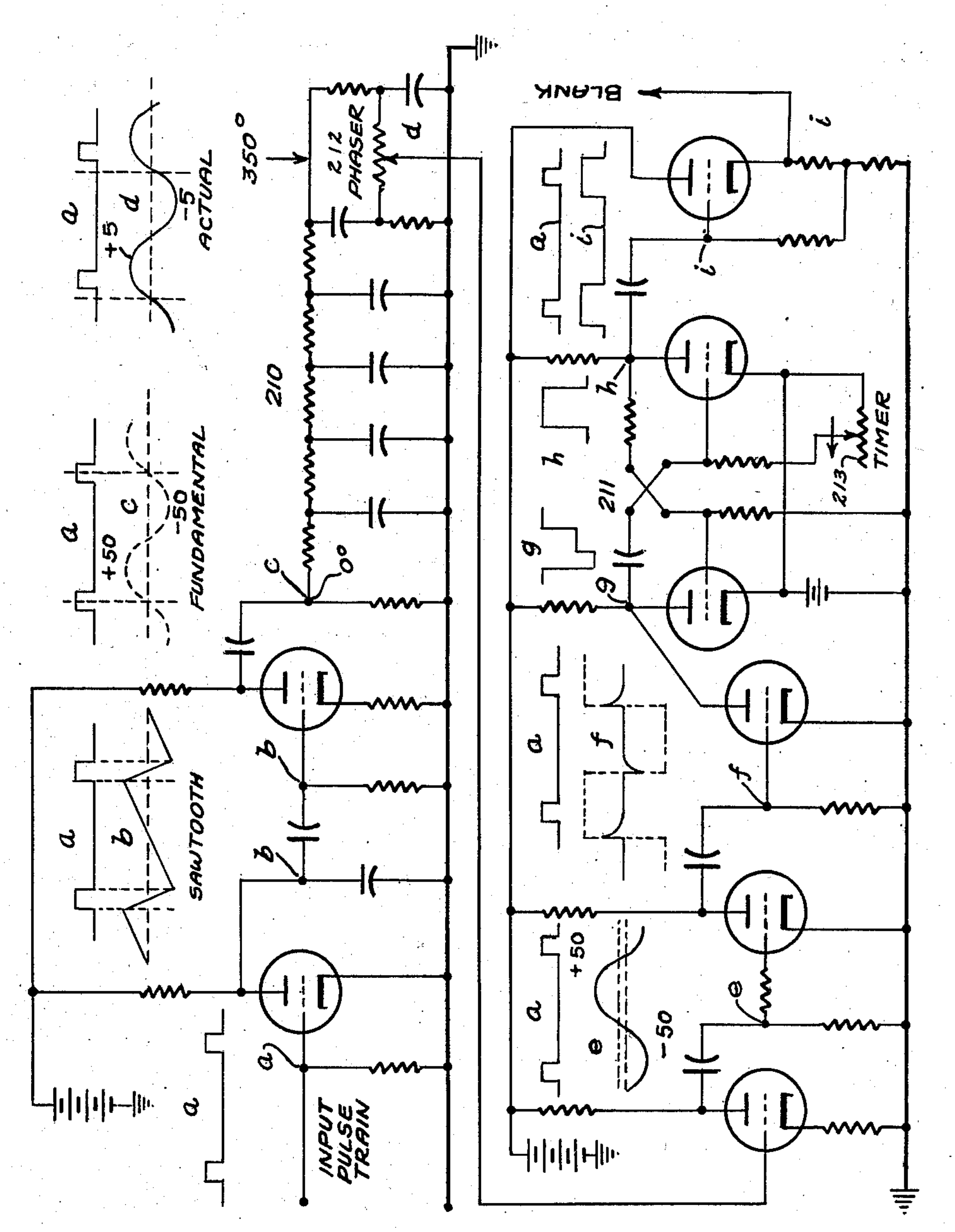
Figure 9 shows an alternative method of producing standard blanking pulses from the standard sync pulses, especially for vertical pulses.
Figure 10:
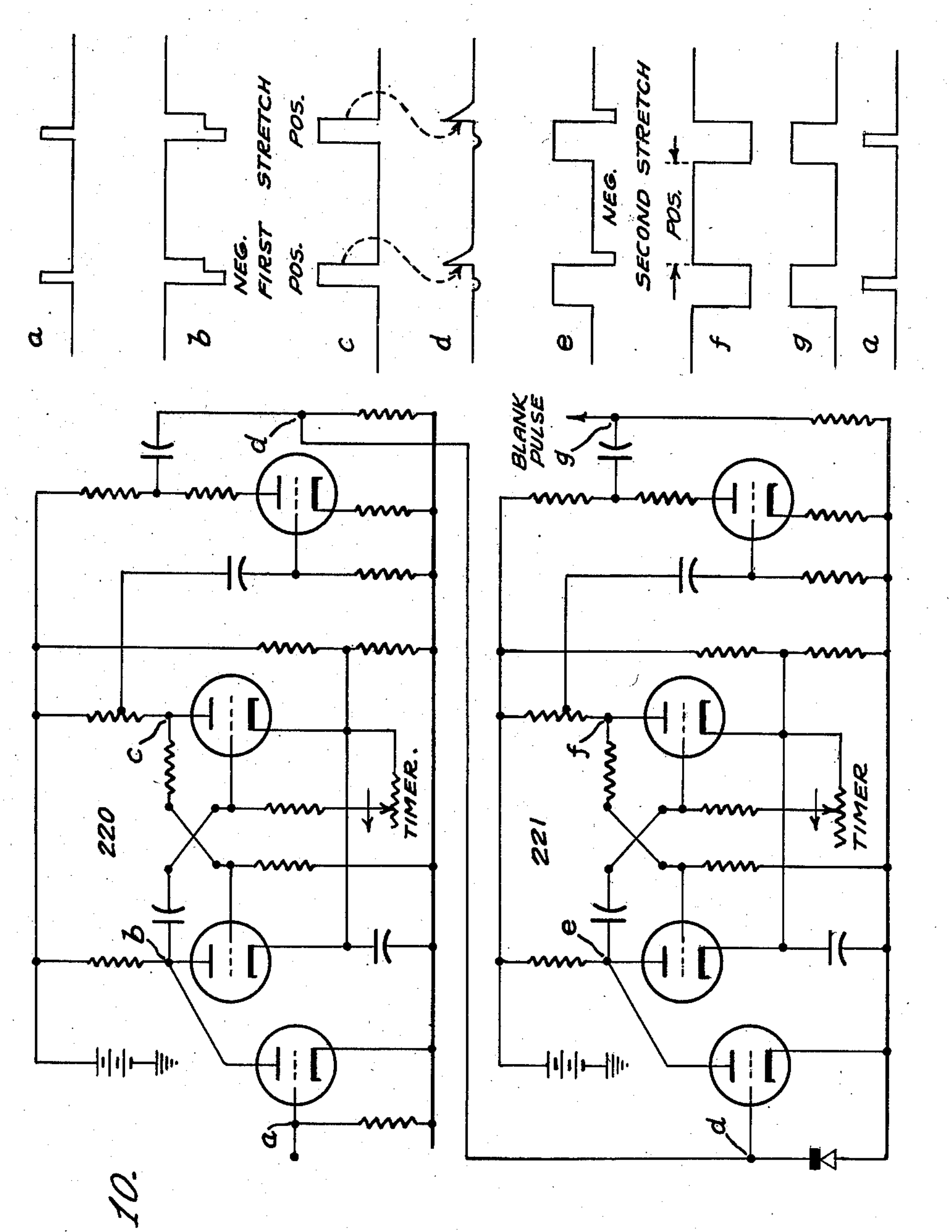
Figure 10 shows a second alternative method of producing standard blanking pulses.
Figure 11:
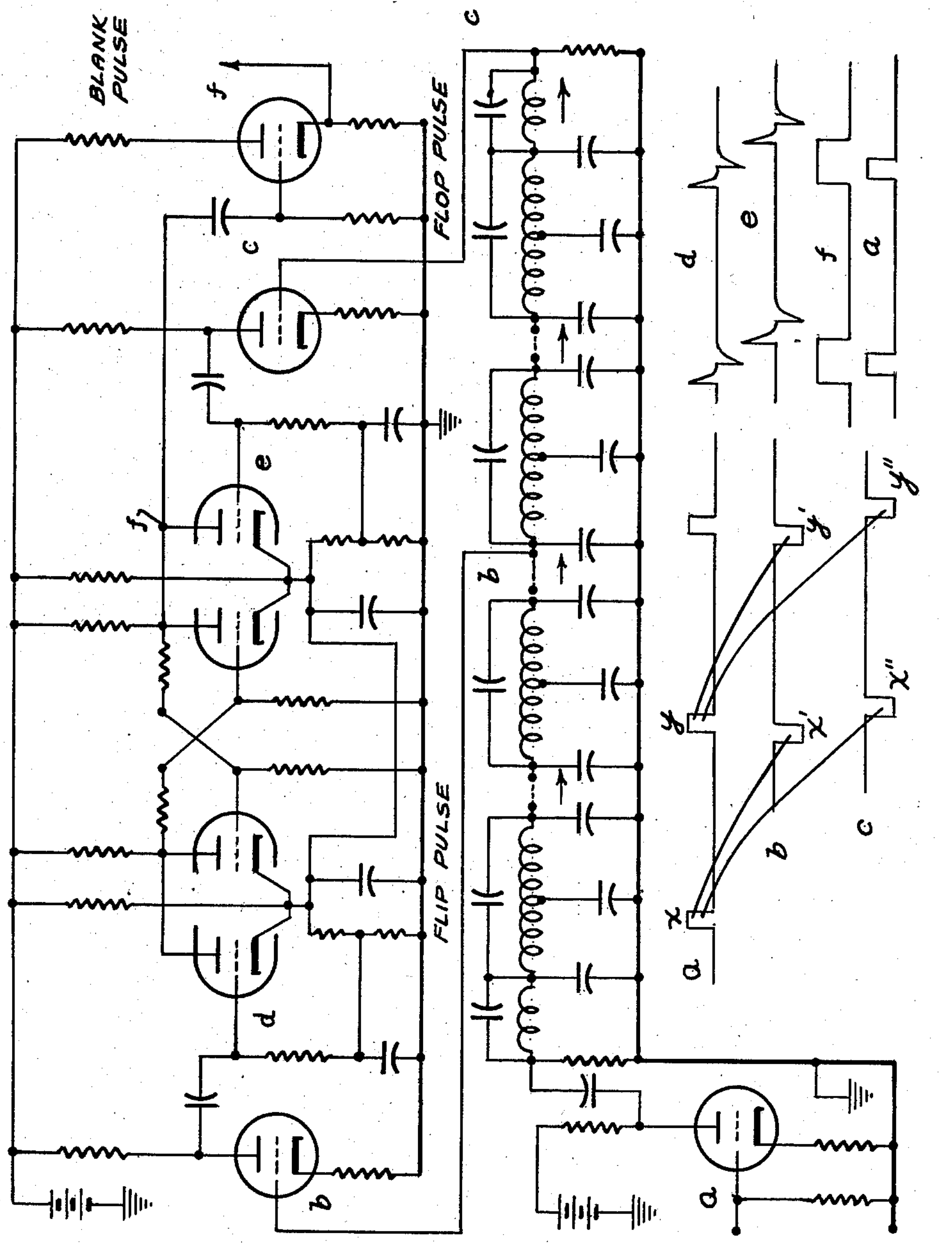
Figure 11 shows a third alternative method of producing standard blanking pulses.

The circuits shown in Figures 4, 5, 6, and 7 are representative only of circuits which can perform the required function. Alternative circuits for forming the pulse trains producing vertical sweep and blanking are shown in Figures 9, 10, and 11. The alternative methods may be applied to produce the horizontal sweep and blanking as well.

Figure 9 shows circuits by means of which a pulse train, such as in the output of a vertical blocking oscillator, and shown at *a*; may be used to create a complete vertical blanking pulse as at *i*, Figure 9 starting prior to the triggering of the blocking oscillator. Briefly, the input pulse train is applied to a discharge-tube circuit to produce a sawtooth wave as at *b* of high fundamental frequency content, with the fundamental of the sawtooth wave passing through zero value substantially at the centers of the creating pulses. This wave is passed through an RC filter 210 to produce a substantially sine wave with adjustable phase as at *d* Figure 9. Thereupon a "square wave" form is produced, which is differentiated to produce triggering pips as at *f* Figure 9. These are impressed upon a single-shot multivibrator 211, and by adjustment of the sine wave phaser 212 and the pulse timer 213, the output blanking pulse *i* is then produced.

Figure 10 shows a circuit which produces the same result as the circuits of Figure 9 using two single-shot multivibrators 220 and 221 in cascade. The first multivibrator, providing a relatively short pulse-stretching effect, establishes the trailing edge of the final blanking pulse at *d* Figure 10; the second multivibrator 221 providing a relatively long stretching effect is triggered by the trailing edge of the output of the first stage, and establishes the leading edge. Thus a complete blanking wave is produced.

Finally Figure 11 shows a method in which the original pulse train is impressed upon a delay line, and pulses taken off with the leading edges occurring at times corresponding to the start and end of the desired blanking pulses. These pulses taken from the line are amplified and differentiated, and a flip-flop circuit is then used to establish the blanking pulse.

The system as described records the view or frame which occurred just previous to the closing of the push button, but not the particular view selected since an appreciable time elapses between the mental selection of the view and the closing of the actuating switch or push button by the hand. This time varies with individuals but may be of the order of one half second. In order to compensate for this delay the composite signal in line 4 of Figure 1 may be delayed so that when the push button is closed the photographic record will be that of the view seen about a half second previously when the selection was made.

Figure 12:
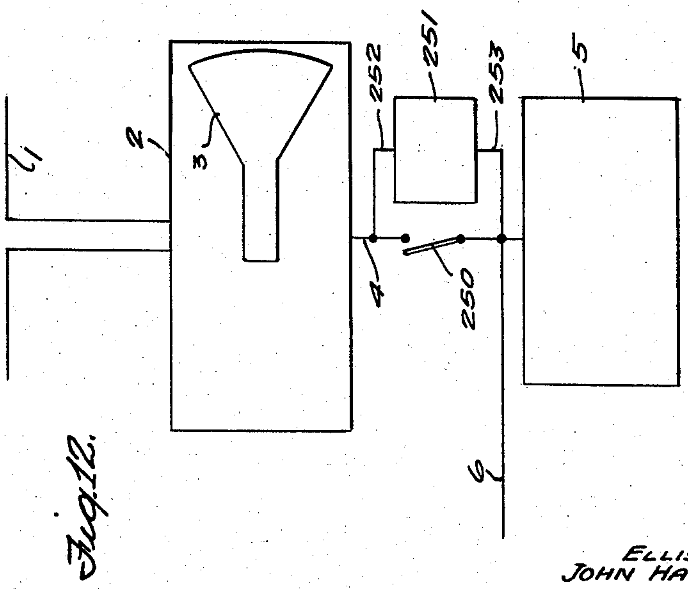
Figure 12 shows a portion of the block diagram of Figure 1 with the addition of a delay device.

Figure 12 shows a delay device 251 connected across switch 250 in line 4. When switch 250 is closed no delay is introduced but when switch 250 is open the composite signal is fed into the input 252 of delay device 251 and the same composite signal, delayed by a certain predetermined time, emerges from device 251 by output line 253, and is fed to the processing circuits already described.

Figure 13:
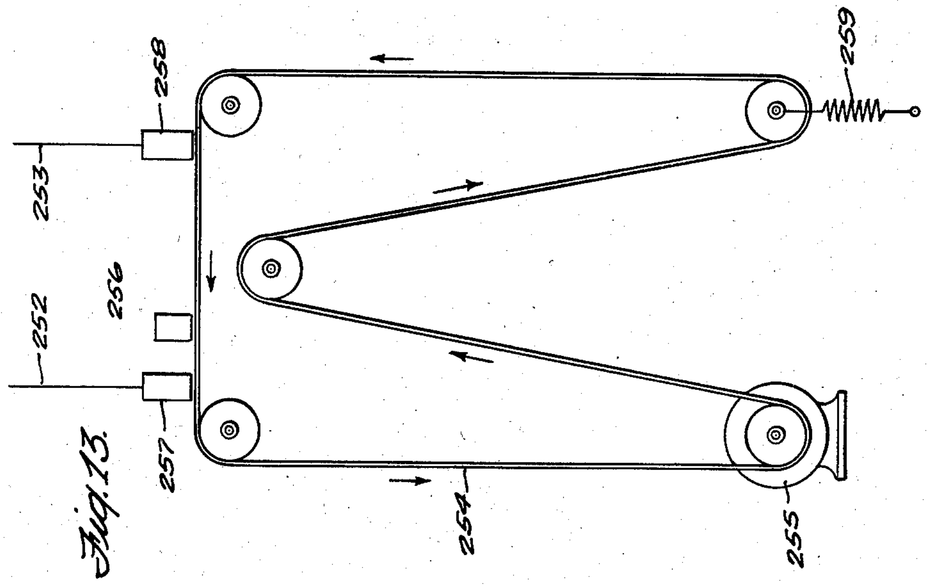
Figure 13 shows in schematic form one type of delay device inserted in Figure 12.

Figure 13 shows one form of time-delay device. An endless magnetic tape 254, of sufficient length to give the proper time delay, is driven by motor 255 at a rate, say of thirty feet per second, sufficient to provide a satisfactory record of the composite signal. The tape runs in the direction indicated by arrows over a series of free-running pulleys as shown in order to confine the length of some 25 feet or more of tape in a small space. One pulley may be provided with a spring 259 for maintaining the tape taut.

The composite signal is recorded on the tape by recording head 257 connected to input line 252. The delayed composite signal is reproduced by head 258 connected to the output line 253. A magnet 256 erases all records on the tape as the tape passes from reproducing head 258 to recording head 257. The time delay can be varied by moving the reproducing head 258 along the tape.

What is claimed is:

1. In combination, a source of video signals, a cathode ray tube including means for forming a beam of electrons, a screen, and means for causing said beam of electrons to trace a scanning raster on said screen, means for applying said video signals to said cathode ray tube in such a sense as to cause said tube to display negative images on said screen, means for photographically recording negative images displayed on said screen, a bias-supplying circuit coupled to said cathode ray tube for alternatively supplying a cut-off bias and an operating bias to an electrode of said cathode ray tube, a control circuit coupled to said bias-supplying circuit, said control circuit in its normal mode of operation causing said bias-supplying circuit to supply a cut-off bias to said cathode ray tube electrode, and selectively actuated means for altering the mode of operation of said control circuit to cause said bias-supplying circuit to supply an operating bias to said cathode ray tube electrode for a predetermined time interval.

2. A combination in accordance with claim 1 wherein said selectively actuated means comprises a manually operable switch, means responsive to the actuation of said switch for driving said control circuit into its altered mode of operation during a control interval of said video signals, and timing means actuated by said driving means for restoring said control circuit to its normal mode of operation after a predetermined whole number of television field intervals.

References Cited in the file of this patent

UNITED STATES PATENTS

| | | |
|---|---|---|
| 2,373,114 | Goldsmith | Apr. 10, 1945 |
| 2,504,734 | Schmidling | Apr. 18, 1950 |
| 2,788,389 | Purington | Apr. 9, 1957 |

OTHER REFERENCES

Rider's Television Manual, volume 7, RCA TA page 7–47 (RCA KCS 47), copyrighted 1951.

RCA Review, March 1954, page 10.